(12) United States Patent
Wickham

(10) Patent No.: US 7,462,285 B2
(45) Date of Patent: Dec. 9, 2008

(54) WASTEWATER PURIFICATION METHOD AND APPARATUS

(76) Inventor: Daniel E. Wickham, P.O. Box 2109, Sebastapol, CA (US) 95473

( * ) Notice: Subject to any disclaimer, the term of this patent is extended or adjusted under 35 U.S.C. 154(b) by 0 days.

(21) Appl. No.: 11/695,767

(22) Filed: Apr. 3, 2007

(65) Prior Publication Data

US 2007/0227970 A1    Oct. 4, 2007

Related U.S. Application Data

(60) Provisional application No. 60/788,867, filed on Apr. 4, 2006.

(51) Int. Cl.
*C02F 3/00* (2006.01)

(52) U.S. Cl. .................. 210/607; 210/620; 210/621; 210/622; 210/150; 210/151; 210/220

(58) Field of Classification Search ............... 210/607, 210/620–622, 150–151, 220
See application file for complete search history.

(56) References Cited

U.S. PATENT DOCUMENTS

| | | | |
|---|---|---|---|
| 5,531,898 A | 7/1996 | Wickham | |
| 6,660,163 B2 | 12/2003 | Miklos | |
| 6,780,318 B2 | 8/2004 | Fife et al. | |
| 2002/0023887 A1 | 2/2002 | Lorenz et al. | |
| 2003/0159988 A1* | 8/2003 | Daigger et al. | 210/605 |
| 2005/0077237 A1 | 4/2005 | Wickham | |
| 2007/0218537 A1* | 9/2007 | Furukawa et al. | 435/252.1 |

* cited by examiner

*Primary Examiner*—Chester T Barry
(74) *Attorney, Agent, or Firm*—Edward S. Sherman

(57) ABSTRACT

The invention described herein provides a novel means to biologically denitrify nitrogenous compounds in wastewater using a simultaneous reaction under aerobic conditions. To conduct this reaction it is necessary to culture both autotrophic ammonia oxidizing bacteria as well as facultative heterotrophic bacteria such that the facultative heterotrophs can denitrify the oxidized ammonia compounds produced by the autotrophic bacteria as they are produced. The device described herein, along with methods of operating such a device, provides a means to facilitate the above reaction.

38 Claims, 8 Drawing Sheets

WASTEWATER PURIFICATION METHOD AND APPARATUS

RELATED APPLICATIONS

This application claims priority to the U.S. Provisional Patent Application entitled "Device to Culture Ammonia Oxidizing Bacteria in a Wastewater Treatment Vessel", having Application Ser. No. 60/788,867 and filed on Apr. 4, 2006, which is incorporated herein by reference.

BACKGROUND OF THE INVENTION

1. Field of the Invention

The present invention relates to aerobic sewage treatment devices and, in particular, to a type of aeration device that cultivates select species of bacteria beneficial in the digestion of organic and other components of human or biological waste in water.

2. Description of the Related Art

As human population has increased over the past several centuries the capacity of natural digestive processes to deal with human generated organic waste has been exceeded by the sheer volume of such waste.

The art of wastewater treatment has been developed to confront this issue and over the past century substantial advances have increased the capacity for bacterial digestion to process these materials at a higher rate.

Organic wastes are complex but largely consist of carbon-based compounds such as proteins, carbohydrates and fats. The groups of bacteria that process such organic carbon compounds are predominantly those that are referred to as "heterotrophic" bacteria.

Heterotrophic is derived from the root "consumption of others" and reflects the fact that such organisms must derive their nutrition from other pre-existing carbonaceous organic materials, be they of animal or vegetable origin.

Heterotrophic organisms utilize carbon in two fundamental ways, one is for biosynthesis of the proteins and other structural components of cells, the second is to oxidize carbon as a source of metabolic energy.

A second group of bacteria exists that is referred to as "autotrophic". These organisms are capable of existing without the need to obtain nutrients from pre-existing organic material and are likely to have been the original forms of life on earth.

Autotrophic organisms derive their metabolic energy from the oxidation of compounds other than carbon, for instance reduced nitrogen as ammonia or reduced sulfur as hydrogen sulfide. They still need carbon for biosynthesis of cellular structures but this they obtain from non-organic or mineral sources such as carbonate or carbon dioxide.

While constituents of organic waste are predominantly carbon, there are other compounds that are released by organic digestion that need to be dealt with. The most prominent of these are compounds of nitrogen, a component of protein and urea produced by living cells.

The heterotrophic digestion of organic wastes results in a conversion of organic nitrogen into ammonia, a toxic compound, especially to aquatic life which is exposed when such wastes are released to natural bodies of water as sewage.

It is widely known that wastewater systems that actively aerate, to provide oxygen to heterotrophic bacteria for the digestion of organic carbon, will also eventually be colonized by autotrophic bacteria capable of oxidizing ammonia to $NO_2$ (nitrite). These autotrophs are typically found in the genera *Nitrosomonas*, *Nitrosococcus* and others.

Nitrite is also relatively toxic and as the waste product, for example of *Nitrosomonas* can, if built up in concentration, retard further oxidation of ammonia by *Nitrosomonas* through the process of "end product inhibition".

Typically a second group of bacteria will develop in such systems that obtain their energy by oxidizing $NO_2$ (nitrite) to $NO_3$ (nitrate). Genera capable of this include *Nitrobacter* and *Nitrospira*.

Because the conversion of nitrite to nitrate in effect removes the waste product of *Nitrosomonas* it releases that organism from end product inhibition by nitrite and *Nitrosomonas* is then free to continue oxidizing more ammonia.

Genera such as *Nitrosomonas* and *Nitrobacter* are mutualistic since the first provides the food for the second while the second removes the waste from the first, to their mutual benefit. Such colonies become tightly linked into what is referred to as a "syntrophic" association.

The final product of the above association is nitrate, a stable compound that, while less directly toxic than ammonia or nitrite, has been identified as a serious environmental pollution problem.

Practitioners in the art of wastewater treatment discovered that a biological method for eliminating nitrate exists that is referred to as "bacterial denitrification". It was discovered that there are heterotrophic aerobic bacteria, known as facultative bacteria, that can survive in anaerobic environments by obtaining oxygen for their metabolism from previously oxidized mineral compounds such as nitrate, sulfate or nitrite.

Nearly all aerobic wastewater treatment technologies developed to date tend to carry the oxidation of ammonia fully to the compound nitrate. Nitrite, the intermediate oxidized form of nitrogen is typically found is extremely low concentrations and is a highly transient component in these systems.

Nitrate is utilized as an oxygen source by facultative heterotrophs only when no source of free oxygen is available. Facultative bacteria process nitrate by first actively transporting the compound across the cell membrane into the cytoplasm and then moving it to the interior of the cell membrane where a membrane bound enzyme strips one oxygen atom from the $NO_3$ to produce the compound $NO_2$ (nitrite). In the process the bacteria obtains a single oxygen atom for use in oxidative metabolism. The $NO_2$ must then be actively transported across the cell membrane back to the outside of the cell, since it is toxic to the organism.

The yield of usable oxygen for oxidative metabolism from nitrate is low, just a single atom, yet the metabolic cost of the transport into and out of the cell is high, so facultative bacteria will use $NO_3$ as an oxygen source only if no free oxygen is available.

Further denitrification from $NO_2$ to $N_2$ gas is a more complex process. The nitrite produced inside the cell of a facultative bacteria, or available in the external milieu, will be processed outside the cell in the periplasm by a series of external membrane bound enzymes that work as a cascade such that $NO_2$ is reduced to NO then combined in a further reduction to $N_2O$ than again to the final $N_2$. At each step oxygen is taken into the cell for oxidative metabolism.

The oxygen yield for processing $NO_2$ is two atoms of oxygen for each nitrite molecule. And, since the process does not involve active transport into the cell, the energetics of the reaction from $NO_2$ is substantially different than the reaction starting with $NO_3$.

It can be seen from the above that even in the presence of free atmospheric oxygen nitrite is an attractive oxygen source. Not only is the yield the same as with $O_2$, namely two atoms of oxygen, atmospheric oxygen as $O_2$ is bound by an energetic double covalent bond. Thus a facultative bacteria can obtain oxygen for oxidative metabolism from nitrite without the need to break and energetic double bond, as it would with $O_2$.

U.S. Pat. No. 6,780,318, which is incorporated herein by reference, describes a wastewater treatment device that grows a dense culture of facultative heterotrophic bacteria in wastewater effluent for the purpose of transporting these cultures out to leach fields that have been clogged with anaerobic slime. The facultative organisms eliminate this slime through the process of fermentation. The intent of the device originally was to open the soil so that clogged leach fields could once again percolate effluent into the surrounding soil for treatment.

In this patent a process is described in which the presence of the aggressive facultative heterotrophs prevents the expected invasion of this aerobic system by autotrophic ammonia oxidizers, thus the nitrogen in the system remains unoxidized as ammonia rather than as the more typical oxidized nitrate found in most aerobic treatment systems.

This patent also describes a process whereby the ammonia discharged from such a system into a previously existing leach field will encounter a pre-existing dense colony of ammonia oxidizing autotrophs that formed during the earlier usage of the leach field. When this happens the effluent is accompanied by a dense colony of facultative heterotrophs, grown in the septic tank. As the pre-existing ammonia oxidizers, such as *Nitrosomonas* or *Nitrosococcus* begin to form $NO_2$, the facultative heterotrophs immediately begin the denitrification from $NO_2$ as described above. In the process the $NO_2$ will be converted to $N_2$ gas, even if atmospheric oxygen is present.

*Nitrobacter* or *Nitrospira,* which would typically oxidize that same $NO_2$ to $NO_3$ are now faced with a competitive organism in the form of the facultative heterotroph, that is considerably more aggressive. Facultative organisms such as *Bacillus* have a doubling time of as little as 30 minutes while Nitrobacter will double in anywhere from 10-30 hours. As the effluent passes through this zone in the soil the ammonia is directly converted to $N_2$ gas without ever becoming fully oxidized to $NO_3$, thus the reaction can occur even if atmospheric oxygen is present.

U.S. patent application 20050077237 A1 (by Wickham, Daniel, Apr. 14, 2005) for a "Method for recovering a disposal trench with a biomat slime, and method for operating a waste treatment vessel" describes a process whereby the same reaction can be created within the treatment vessel itself by first establishing a colony of autotrophic ammonia oxidizers in the device before the facultative culture is introduced into the system.

When the facultative organisms are introduced they will out compete the *Nitrobacter* type organisms and the denitrification will proceed as in the soil. With the traditional method, in which ammonia is oxidized to $NO_3$ and then subjected to an anaerobic environment for dentrification, it has proven difficult to sustainably reduce nitrate concentrations to less than 10 mg/l, the federal drinking water standard for nitrate.

Given the need for a technology that can consistently reduce nitrates below the drinking water standard, and the fact that conventional technology consumes a tremendous amount of energy to oxidize ammonia completely to nitrate prior to the denitrification step, a means to sustain the direct aerobic denitrification described above would be of inestimable value to the industry and to society.

Accordingly, it is therefore a first object of the invention to provide a method of wastewater treatment that does not depend on the action of bacteria in a soil leach field or engineered mound septic system to remove ammonia.

It is another object of the invention to provide an apparatus for wastewater treatment that supports the above methods and can be implemented in existing septic tanks of various sizes or modified for use in larger scale wastewater treatment plants and facilities.

SUMMARY OF THE INVENTION

The present invention provides a method to sustain a culture of autotrophic ammonia oxidizing bacteria within a treatment vessel that also has been fitted with a facultative heterotrophic bacterial generator. The method includes a means of aerating and feeding the ammonia oxidizing culture in a device that is isolated from the general contents of the treatment vessel.

The method includes an aeration device that consists of a fine-bubble diffuser within a contained area that aerates and circulates liquid within the contained area over one or more matrices provided as surfaces for colonization by ammonia oxidizing bacteria in the device.

The method also includes a means of introducing a culture of ammonia oxidizing bacteria into the device as well as a feed system that allows a measured flow of ammonia containing liquid from the surrounding treatment vessel to enter the device providing food for the ammonia oxidizing bacteria.

The method also provides a means of regulating the flow of wastewater into the device so that the effluent can be contained within the device for a long enough period that organic carbon contained in that flow will become depleted and the interior environment will favor the autotrophic organisms that obtain carbon from mineral sources such as $CO_2$ over the facultative heterotrophic bacteria that can only utilize organic carbon.

The method also includes a means of circulating the aerated water within the device so that liquid containing food resources for the attached ammonia oxidizing bacteria is distributed throughout the device. In the present invention the diffuser within the aerator/circulator is supplied with air from a remote air pump or compressor delivered through a pipe or hose connected from the pump to the diffuser.

The method also includes a means to allow liquid contained within the device, and enriched in ammonia oxidizing bacteria grown within the device, to flow into the surrounding treatment vessel, thereby inoculating that vessel with such bacteria.

The method of the invention also can include a material consisting of calcium carbonate, in the form of crushed or intact oyster shells or other similar material, which stimulate the growth of autotrophic ammonia oxidizing bacteria, thus providing a reserve of inorganic carbon to maintain the colony.

The method also provides a central tube within the column of the device that allows a porous packet of bacterial cultures to be added and held within the aerated water column generated by airlift action.

The method also provides a means of feeding the portion of the treatment vessel in which the nitrification/denitrification reaction occurs with a supply of organic carbon if necessary to sustain the facultative organisms that carry out the denitrification step.

The above and other objects, effects, features, and advantages of the present invention will become more apparent

DETAILED DESCRIPTION

Figure 1:
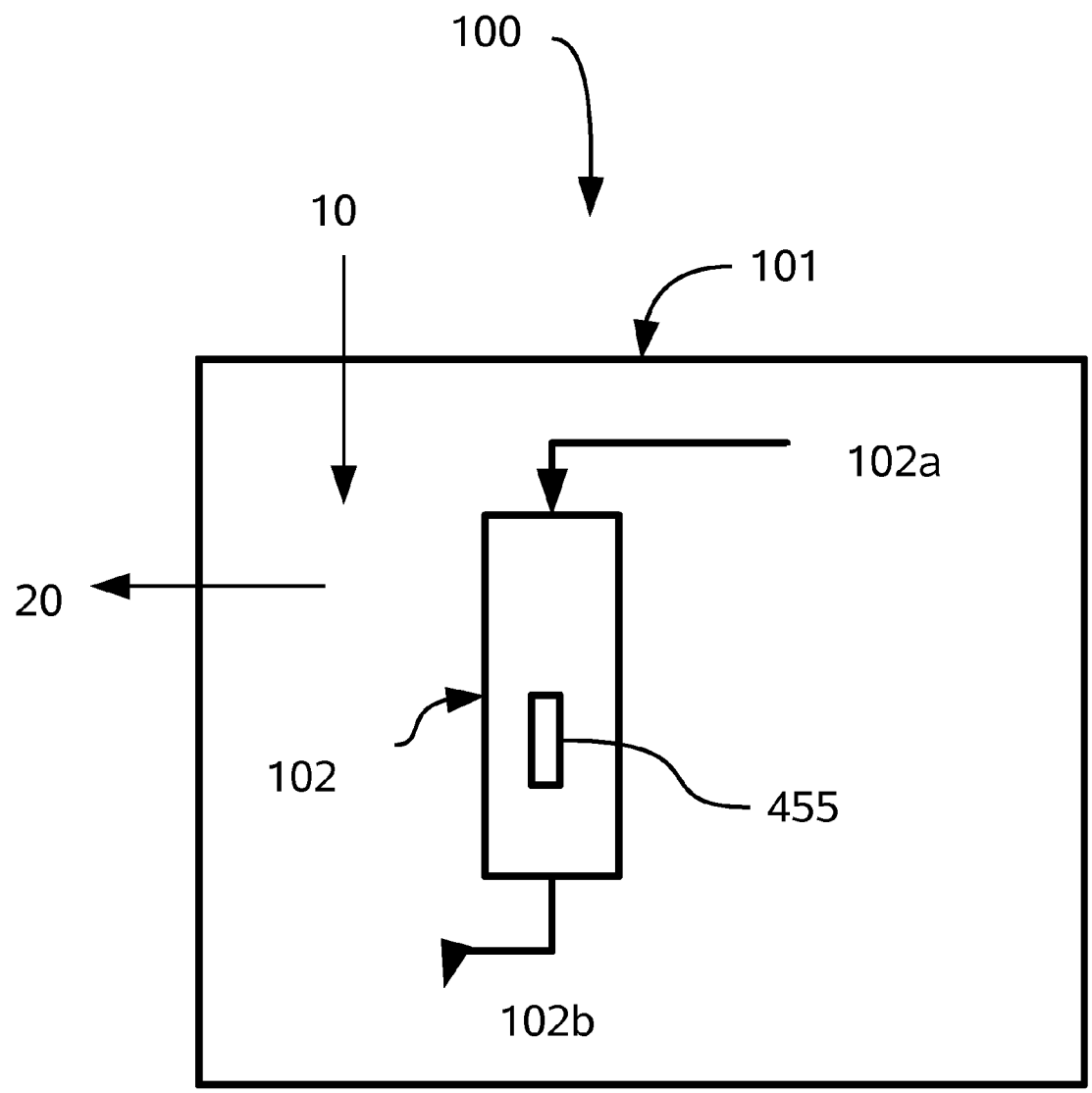
FIG. 1 is a block diagram of an apparatus to illustrate a method that constitutes a first embodiment of the invention.

Referring to FIGS. 1 through 8, wherein like reference numerals refer to like components in the various views, there is illustrated therein a new and improved apparatus and method for wastewater treatment, generally denominated 100 herein.

The inventor has discovered that the reaction of autotrophic ammonia oxidizing bacteria in a sealed tank of the prior art reactors is considerably less stable than that found in the soil. In a pre-existing leach field one finds several hundred cubic feet of soil that is permeated with a firmly established colony of autotrophic ammonia oxidizers. The facultative organisms introduced into this environment through the use of the aerobic bacterial generator described in U.S. Pat. No. 6,780,318 will not competitively exclude the *Nitrosomonas* type organisms and will instead supplant the *Nitrobacter* type organisms in a new form of syntrophic association with *Nitrosomonas*.

This is consistent with the inventor's observations that the reaction in the treatment vessel has shown that when a culture of *Nitrosomonas* type organisms is established it will co-exist with the introduced facultative bacteria for a period of time during which almost all the ammonia will be oxidized and eventually denitrified to a gaseous form. Unfortunately this does not appear to be a sustainable situation and within anywhere from 6-12 months the facultative bacteria will eventually exclude the ammonia oxidizers from the tank and nitrogen will cease being either oxidized or denitrified and will thus persist as ammonia.

However, it was also discovered by the inventor that when this novel form of denitrification operates successfully one is able to reduce the concentration of total nitrogen in the treated effluent to levels as low as 1 mg/l measured as N.

FIG. 1 is a block diagram to illustrate a method that constitutes a first embodiment of the invention. The waste water treatment device 100 comprises a chamber or vessel 101 for receiving waste water. The vessel may have one or multiple portals for adding wastewater and removing treated wastewater. Arrow 10 schematically identifies the inlet port whereas arrow 20 schematically identifies the outlet port. The colony of autotrophic ammonia oxidizing bacterial species is sustained in sub-chamber 102. Sub-chamber 102 optionally has at least one inlet port 102a for receiving the initial colony or feed stock of bacteria, as well as receiving fluid from vessel 101 as will be described below. Further, sub chamber 102 as has at least one outlet port 102b to provide the vessel outside of sub-chamber 102 with a supply of bacteria sustained therein.

Using the device of FIG. 1, one embodiment of the method comprises the step of introducing and sustaining a colony of autotrophic ammonia oxidizing bacterial species into a treatment device 100. The autotrophic ammonia oxidizing bacterial species are established and sustained in sub-chamber 102. The surrounding volume of vessel 101 is also colonized with facultative heterotrophic bacteria. Additional embodiments of the invention below will describe variations and alternative embodiments of an apparatus and method introducing and sustaining such a colony of autotrophic ammonia oxidizing bacterial species.

The liquid in the wastewater treatment vessel in which the invention is installed contains ammonia that is toxic to aquatic life when discharged into the environment, or will become converted to nitrate, which is also problematic to the natural environment.

It has become appreciated that the facultative bacteria in the treatment vessel will normally out compete any autotrophic ammonia oxidizing bacteria within the treatment vessel, even though if the two types of bacteria could be sustained within the treatment vessel their joint effect would be the direct elimination of the nitrogenous compounds through a bacterial nitrification/denitrification reaction.

Figure 2:
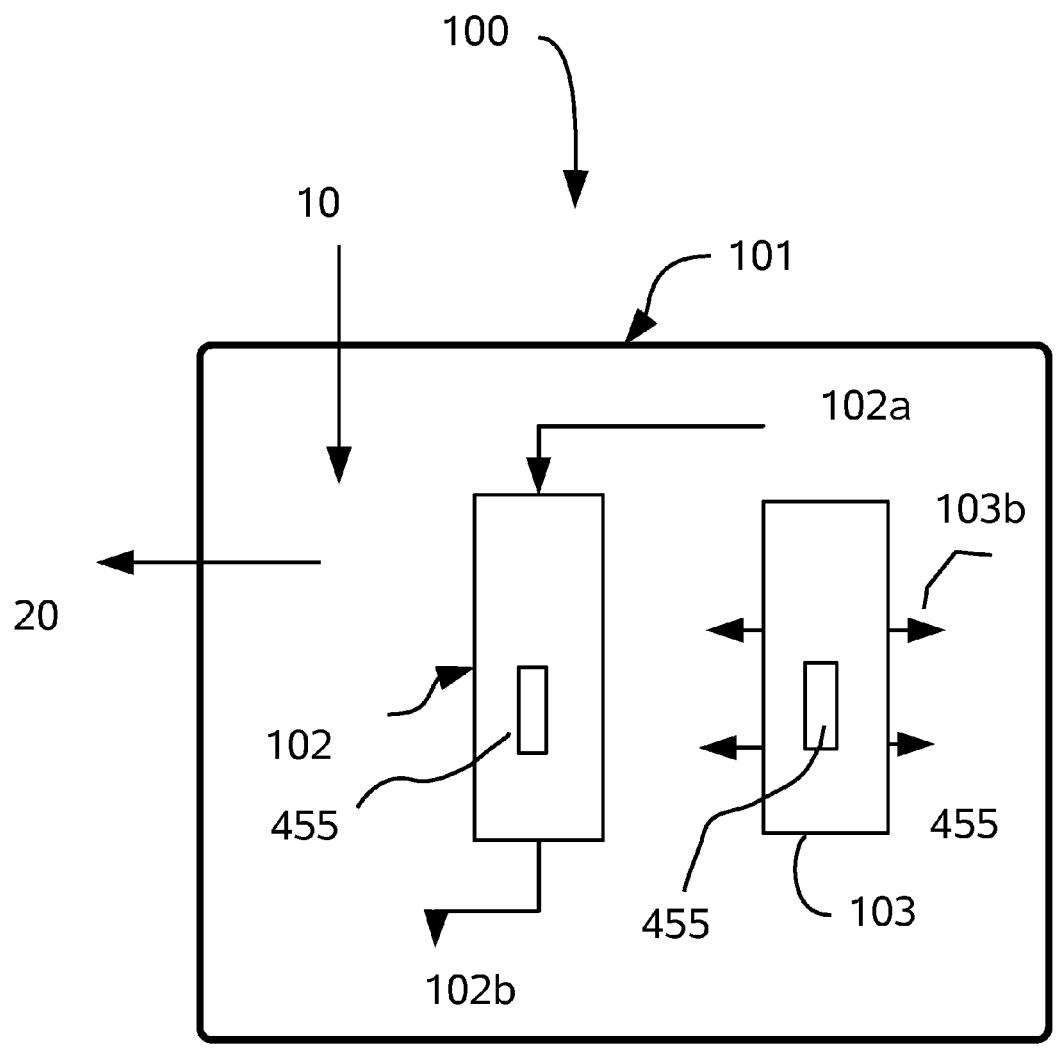
FIG. 2 is a block diagram of an apparatus to illustrate another embodiment of the invention.

FIG. 2 shows a more preferred embodiment of the invention wherein vessel 101 now includes a second sub-chamber 103.

FIG. 2 shows a flow chart that illustrates a method 200 in accordance with the present invention. Method 200 is an example of one way of implementing method 100. As shown in FIG. 2, method 200 begins at step 210 by aerating and circulating liquid within a column that is installed in a wastewater treatment vessel also containing a device to culture facultative heterotrophic bacteria. Following this, method 200 moves to step 212 to provides a host material within the device that provides a matrix for colonization by autotrophic ammonia oxidizing bacteria.

Figure 3:
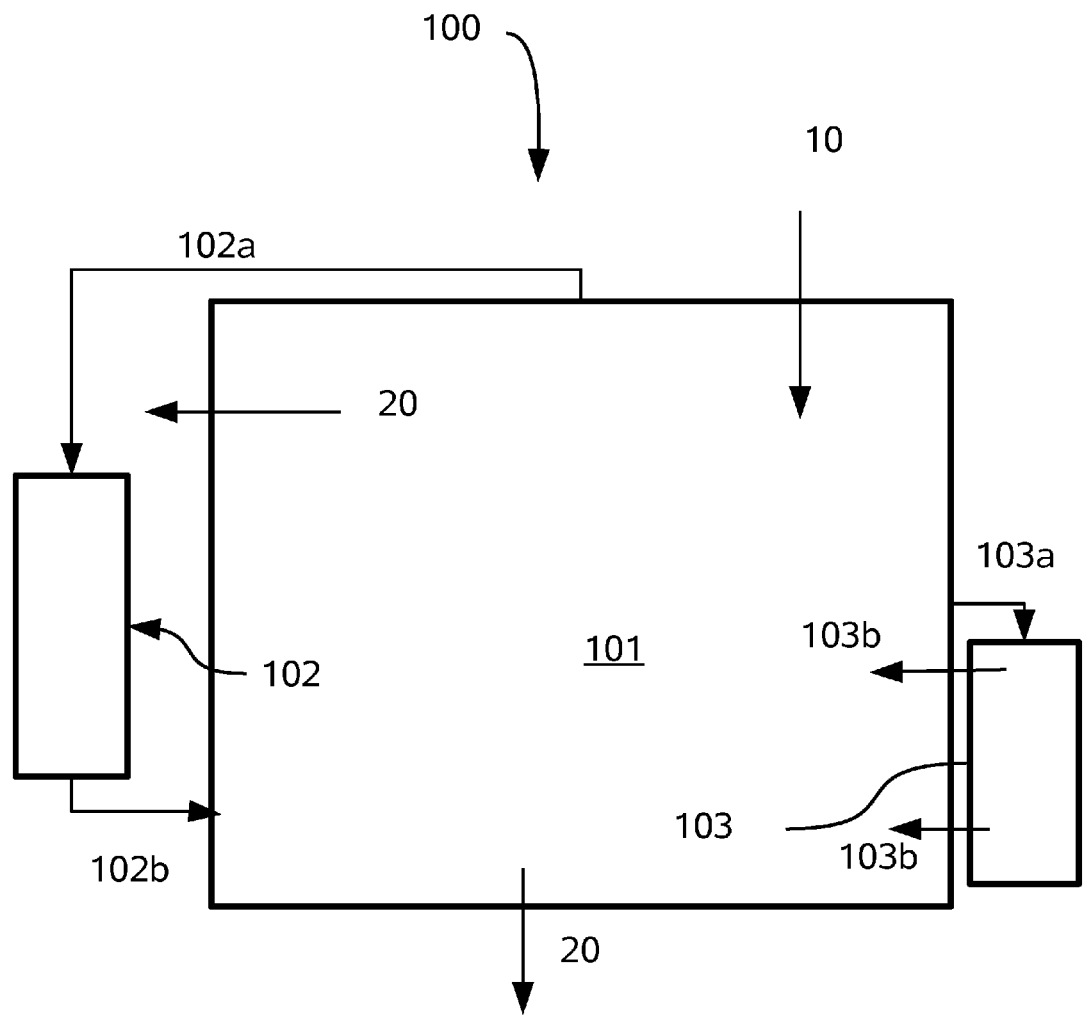
FIG. 3 is a block diagram of an apparatus to illustrate another embodiment of the invention.

FIG. 3 shown an alternative embodiment wherein sub-chambers 102 and 103 are not inside vessel 101, but are in fluid communication therewith via there respective entrance and exits portals.

FIG. 3 shows a flow chart illustrating a method 300 in accordance with the present invention. Method 300 is an example of implementing method 100. Method 300 begins at step 310 by providing a means to introduce ammonia containing effluent from the treatment vessel in which the device is installed into the column for aeration and circulation over the medium within the device.

Following this, method 300 moves to step 312 to regulate the flow of ammonia containing effluent into the device, which also contains facultative heterotrophic organisms cultivated outside the device but within the treatment vessel, such that the residence time within the device will be long enough that the organic carbon being introduced along with the ammonia will be depleted, thus restricting the growth of facultative heterotrophic bacteria within the device which require organic carbon for their metabolism.

The organic carbon will be converted by aeration to $CO_2$, which is the preferred source of carbon for biosynthesis by autotrophic ammonia oxidizing bacteria and these autotrophic organisms will predominate within the device against competition from the facultative heterotrophic bacteria entering with effluent from the external treatment vessel.

Figure 4:
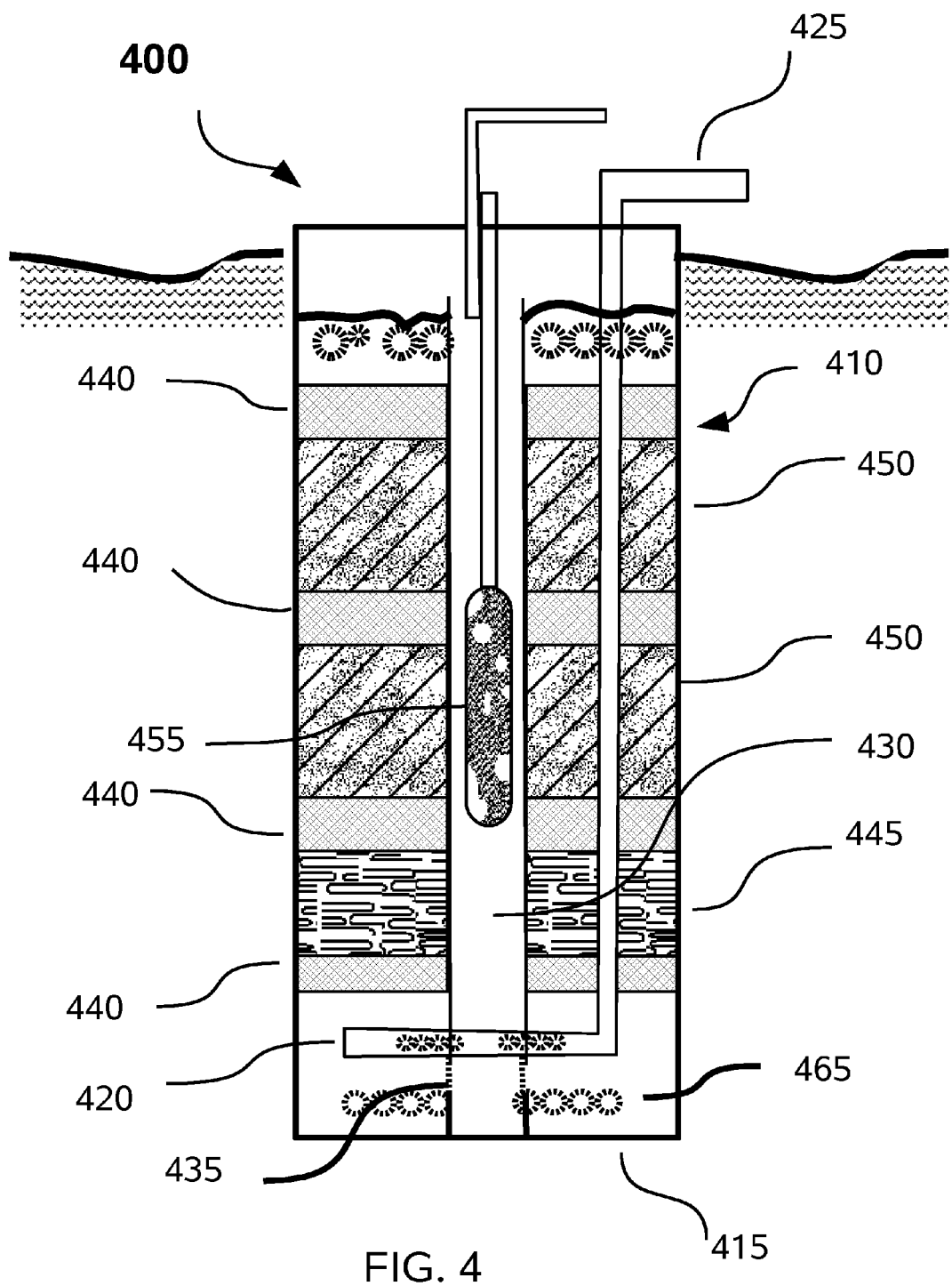
FIG. 4 is a cross-sectional illustration of an embodiment of an exemplary ABG.

FIG. 4 illustrates a method 400 in accordance with the present invention. Method 400 is an example of implementing method 100. As shown in FIG. 4 method 400 begins at step 410 by providing a means for the liquid being introduced into the device to pass back to the treatment vessel in which the device is installed.

Autotrophic ammonia oxidizing bacteria cultured within the device will continuously be delivered into the surrounding treatment vessel such that they will be able to oxidize ammonia to nitrite ($NO_2$) thereby providing the resident facultative heterotrophic bacteria with a source of oxygen. As the facultative bacteria within the treatment vessel strip the oxygen from the nitrite produced by the autotrophic ammonia oxidizers they will convert it to nitrogen gas, thereby eliminating nitrogenous compounds from the treated effluent.

FIG. 4 shows a cross sectional view that illustrates a preferred embodiment wherein sub-chamber 103 is aerator/filtration device for autotrophic bacteria generation (ABG) 400 in accordance with the present invention. Aeration/filtration device 400 is an example of a device that can be used to implement the methods of the present invention. As shown in FIG. 4, aerator/filtration device 400 includes an outer column 410 that is closed at the bottom 415. The device is fitted with a preferably circular manifold 420 with small holes for diffusing fine bubble at the center. The manifold 430 is supplied with air from an external source through a pipe 425 under pressure to manifold 420. The air diffuser is placed within a central pipe 430 that allows the rising air to displace liquid within the column such that it rises, drawing in new liquid through openings 435 at the base of the column 430.

Liquid passing up through the central pipe overflows and passes down through a fibrous matrix 440. This fibrous matrix not only provides abundant surface area for colonization by aerobic bacteria, it also is supported such that it holds in place a chamber beneath it 445 that contains materials such as oyster shells that provide a calcium carbonate base material for the colonization of autotrophic ammonia oxidizing bacteria. It is currently believed preferable to provide a porous, high surface area and relatively inert matrix 450, such as the mineral vermiculite, perlite, sand, silt and the like, between the fibrous matrix layers. It should be appreciated that the combination of fibrous material 440 and inert particulate material 450 acts as a bacterial host material. The bacterial host material is optional a coiled lattice of plastic sheet film or fibrous mat that provides a combination of a high surface area with sufficient porosity so that the flow of liquid there through is not severally impeded. Accordingly, any known bacterial host material is alternatively deployed.

The liquid then passes down through another fibrous layer that again provides surface area for bacterial colonization, but also acts to contain a chamber that holds a material like vermiculite that contributes an extensive surface area for further colonization by aerobic bacteria circulating with the effluent in the device.

Preferably placed within the central pipe in the device 400 is an apparatus 455 that consists of an absorbant material that is impregnated with a culture of ammonia oxidizing bacteria such as *Nitrosomonas* or *Nitrosococcus*. Bacteria in this apparatus are provided with a steady supply of food and air as the contents of the device circulates through the pipe and over the absorbent apparatus. Perforations 465 at the base of the outer column allows liquid containing autotrophic ammonia oxidizing bacteria growing within the device to pass outside into the treatment vessel in which the device is placed.

Figure 5:
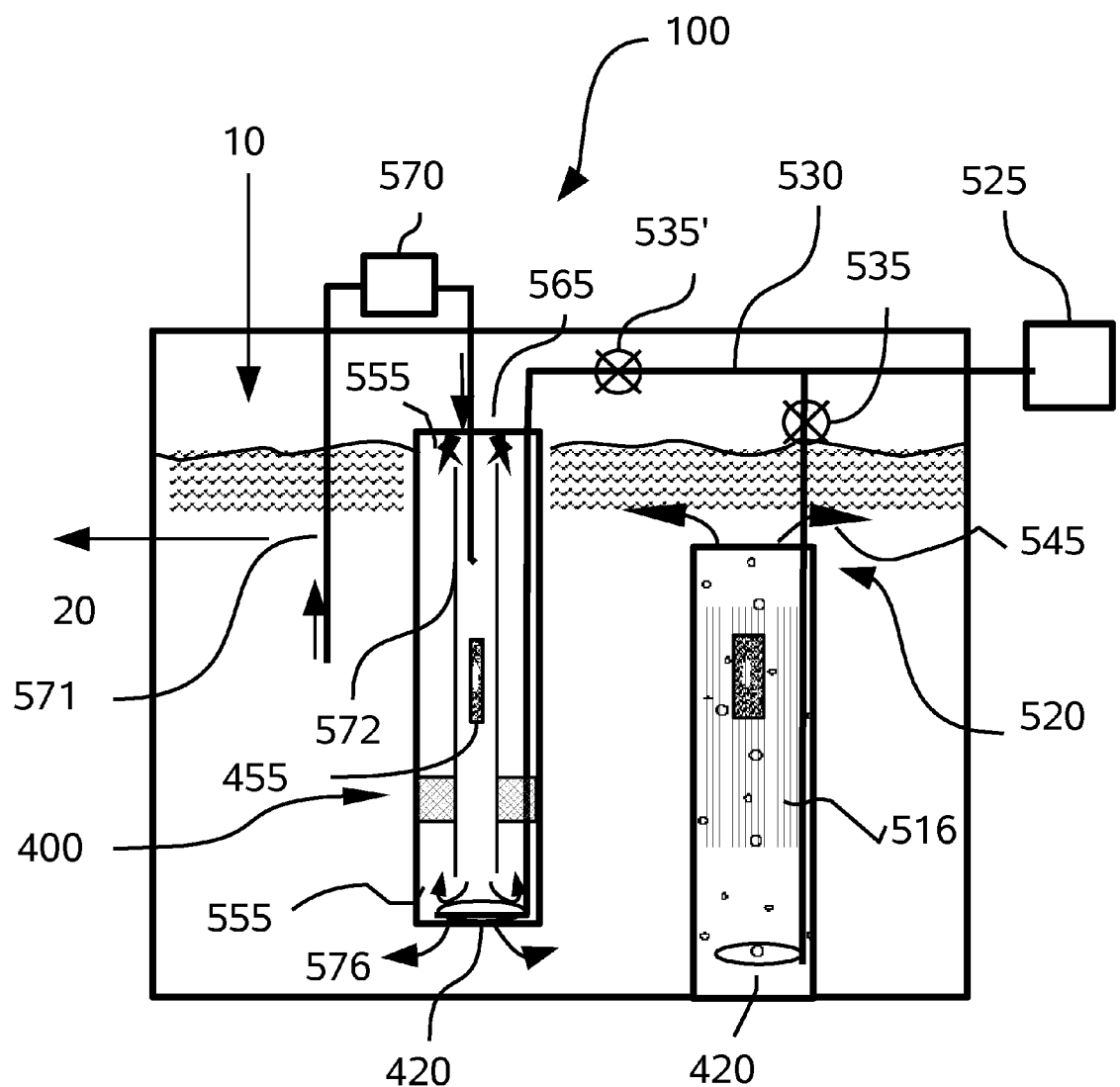
FIG. 5 is a cross-sectional illustration of an embodiment of a wastewater treatment device deploying the embodiment in FIG. 4.

FIG. 5 shows a cross sectional view of the aeration/filtration device 400 installed in a treatment vessel 101 also containing a facultative aerobic bacteria generator (FBG) 520. As the bacteria generator device is now known in the art as taught in U.S. Pat. No. 6,780,318, it will be described briefly. Both ABG devices 400 and FBG device 520 are supplied with air from an external pump 525 through pipes 530 to their respective manifolds 420. Valves 535 allow regulation of air flow to the two devices for balancing aeration rates. Air bubbles rising through the manifold 420 in FBG 520 sets up a circulation shown by curved arrows 545 of fluid through the FBG device of liquid entering the base of the device and leaving the top of the device, which is preferably submerged below the water line in the treatment vessel. FBG device 520 include a biological host material 516 disposed above the air manifold 420.

Similarly the air bubbles released within the ABG device 400 set up a current 555 that flows into the base and up out of the top of the central pipe within the device ABG device 400. Unlike FBG device 520 the outer column of ABG device 400 is preferably elevated such that the upper lip 565 is above the water level within the treatment vessel. Alternatively, ABG device 400 can be below the surface of the liquid and either completely sealed at the top or use 1 way valves (not shown). Liquid is supplied to device 610 via a volumetric pump 570 or an airlift percolation apparatus, such as a narrow tube, that captures the energy of the rising air bubbles from the associated FBG 520. Depending on the means to substantially isolate the ABG device 400 from free exchange with the surround fluid, the pump 570 may alternatively introduce liquid into the top of the device or elsewhere.

Pump 570 removes fluid from below the surface in vessel 101 via tube portion 571 and feeds it to ABG device 400 via tube portion 572. It should be appreciated that when pump 570 is replaced with airlift percolation apparatus, tube 571 should be placed proximate to, above or within FBG device 520 so as to receive fluid under pressure or surge action from the rising air bubbles.

Generally, however it is preferred that liquid flowing into ABG device 400 from the surrounding vessel 101 displaces liquid within the ABG device 400 forcing it to pass through perforations 575 at the base of the device and out into the surrounding treatment vessel at a rate equivalent to the rate entering at the top of the device. As ABG device 400 is closed but for holes 565 at the bottom, the flow out of the device 400 shown by arrows 576 is rather weak and is intended to be generally about the same as the volume of fluid introduced by pump 570.

In this fashion autrotrophic ammonia oxidizing bacteria growing within ABG device 400 are continuously released to the surrounding treatment vessel.

As will be described below with a working example, flow from pump 570 is regulated so that the turnover time of liquid entering the ABG device 400 is long enough in duration that carbon will be depleted and the environment will favor the growth of autotrophic ammonia oxidizing bacteria.

In this fashion the facultative bacteria produced in ABG device 400 that carry out the denitrification portion of the nitrification/denitrification reaction described earlier can flourish within the treatment vessel 101, but the refuge provided by the ABG device 400 sets up environmental conditions that favor the autotrophic ammonia oxidizers and protect them from competition by the more vigorous facultative bacteria.

Figure 6:
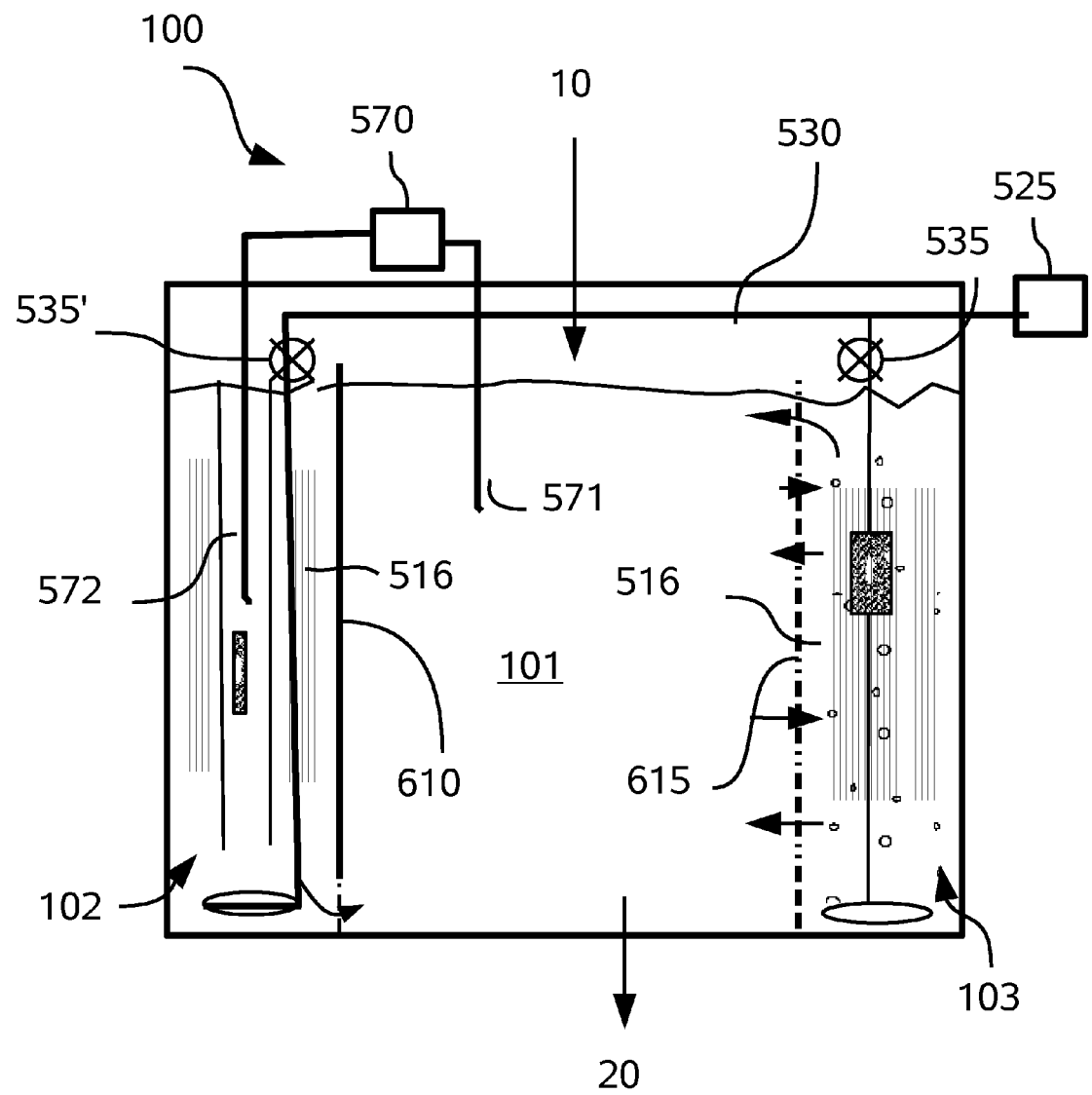
FIG. 6 is a cross-sectional illustration of an alternative embodiment of a wastewater treatment device.

FIG. 6 illustrates another alternative embodiment of the invention variant of the invention that can be implemented in a larger treatment system but achieves essentially the same purpose. Partitions 610 and 615 placed within a larger containment system or vessel 101 are placed such that they form a closed portion within the treatment vessel. The partitions 610 and 615 defined the regions or sub-chambers 102 for the ABG device and 103 for the FBG device respectively. The partition 615 is reasonably porous or is position below the level of the fluid to provide a fluid interchange with the sub-chamber and the interior of vessel 101 between the sub-chamber 102 and 103. In contrast, partition 610 extends above the fluid surface and is relatively non-porous to minimize the exchange of fluid between sub-chamber 102 and the region of vessel 101 between sub-chambers 102 and 103. Preferably, as in the embodiment described with respect to FIG. 5, the exchange of fluid is proportional to the displacement of fluid drawn from the interior of vessel by pump 570.

Figure 7:
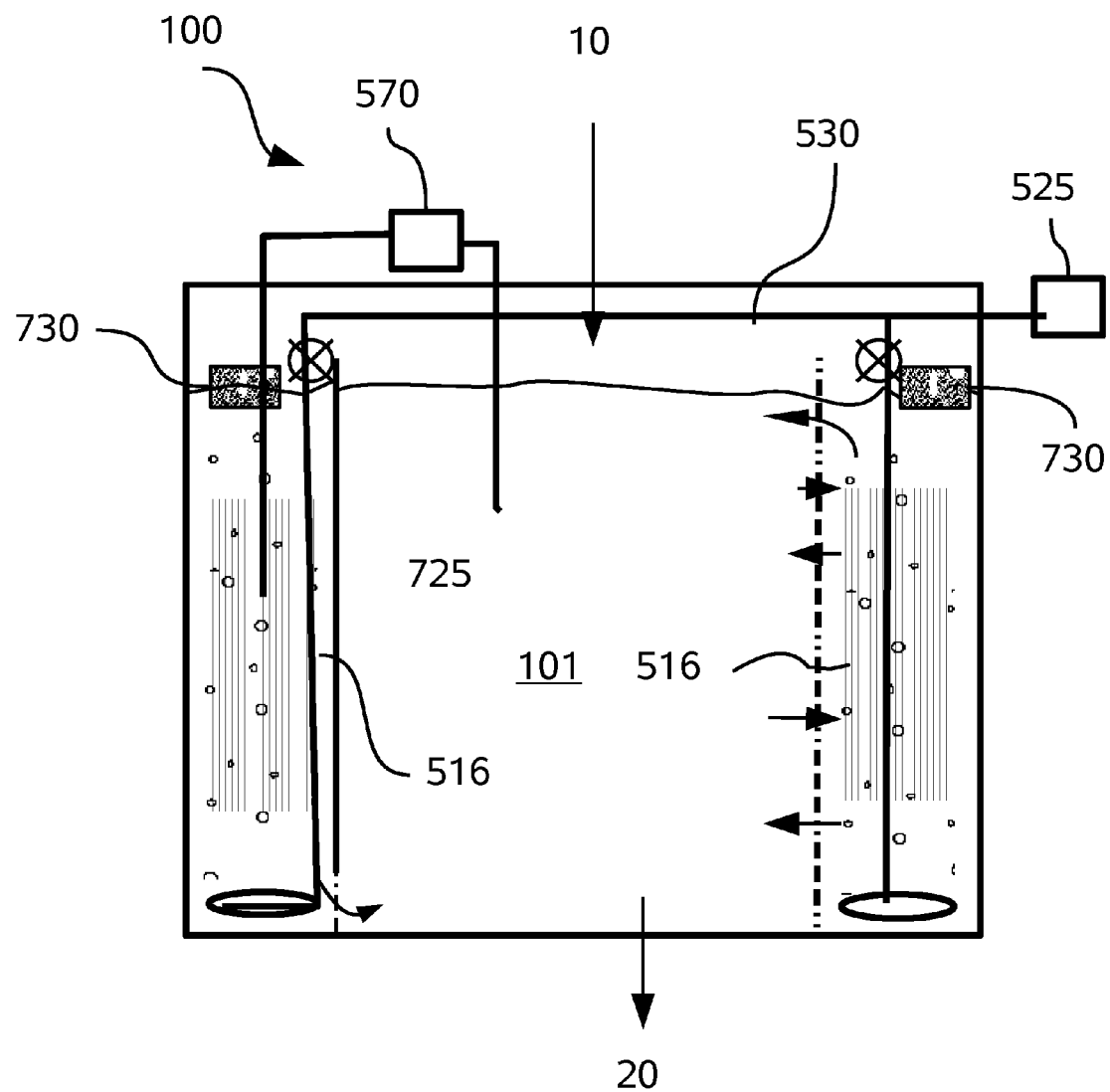
FIG. 7 is a cross-sectional illustration of another alternative embodiment of a wastewater treatment device.

FIG. 7 illustrates a variant of the device that can be implemented in a larger treatment system but achieves essentially the same purpose. Partitions 610 placed within a larger containment system 615 are placed such that they form a closed portion within the treatment vessel. The sides of the partition are constructed so that they pass up above the surface level of the liquid in the vessel 101 so aeration or mixing within the partition will not move liquid up and out of the closed section.

Within the containment section are placed one or more aerators 725 to increase the dissolved oxygen to levels sufficient to meet the respiratory needs of autotrophic ammonia oxidizing bacteria. Floating materials 730 can be placed within the closed section to act as a surface for colonization by ammonia oxidizing bacteria.

The bottom of the closed section within the treatment vessel can either be sealed from the rest of the vessel with a membrane 735 or it can be open, so long as the side partitions can be situated low enough in the water column 740 to limit the exchange of liquid between the outer treatment vessel and the inside of the closed area.

Liquid from the surrounding treatment vessel can be introduced into the partitioned space within the vessel through means of a pump 570 that lifts liquid from the outer vessel and distributes it into the contained space from above 750. Liquid introduced from above will displace liquid within the contained space forcing it to move out into the surrounding treatment vessel at the bottom 755 or through perforations in the space if it is closed at the bottom 760.

Bacterial generators capable of inoculating with and maintaining a substantial colony of facultative heterotrophic bacteria are placed in the area within the treatment vessel that surrounds the contained interior space 765. Flow from the outer treatment zone into the confined interior space is controlled such that the hydraulic residence time within the space provides sufficient time to deplete the store of organic carbon, thereby favoring autotrophic ammonia oxidizing bacteria over heterotrophic facultative bacteria. Flows and organic load to the outer treatment vessel are regulated such that sufficient organic carbon is present for the support of the facultative heterotrophs so that they can carry out the denitrification reaction utilizing nitrite produced by the ammonia oxidizing bacteria introduced into the vessel from the interior confined space.

As will be further described with respect to the following experimental results, it is important that the dosing rate be neither too low or too high. Generally, it is preferred that the dose rate is in proportion to the volume of the container such that the mean residence time of the dosing fluid is about 1 and 20 days, but more preferably between about 2 and 7 days. The optimum is readily determined through experimentation for each particular installation to the extent that there is a variation in the overall treatment volume to the volume of the generator unit. However, as the concentration of ammonia is about 25-36 mg/l with the generator, it is preferable to start with a flow rate to give a flow rate at the upper end of the above residence time range. If after a few days, the ammonia concentration in the generator has dropped to near zero mg/l and the concentration in the surrounding tank volume has not dropped as precipitously, then the flow rate can be increased (shortening the residence time) until the concentration of ammonia inside the generator is 0.3 to 2 mg/l and the surrounding ammonia concentration is under 3 mg/l. When the generator is being overdosed, too short a residence time, then the concentration of ammonia inside and around the generator will be much closer to the initial values, with some decrease being a positive indication that a quality culture of bacteria was used to initiate the process. Naturally, such values are merely guidelines owing to the great variety of character and rate that wastewater may enter and drain from a particular treatment system.

Figure 8:
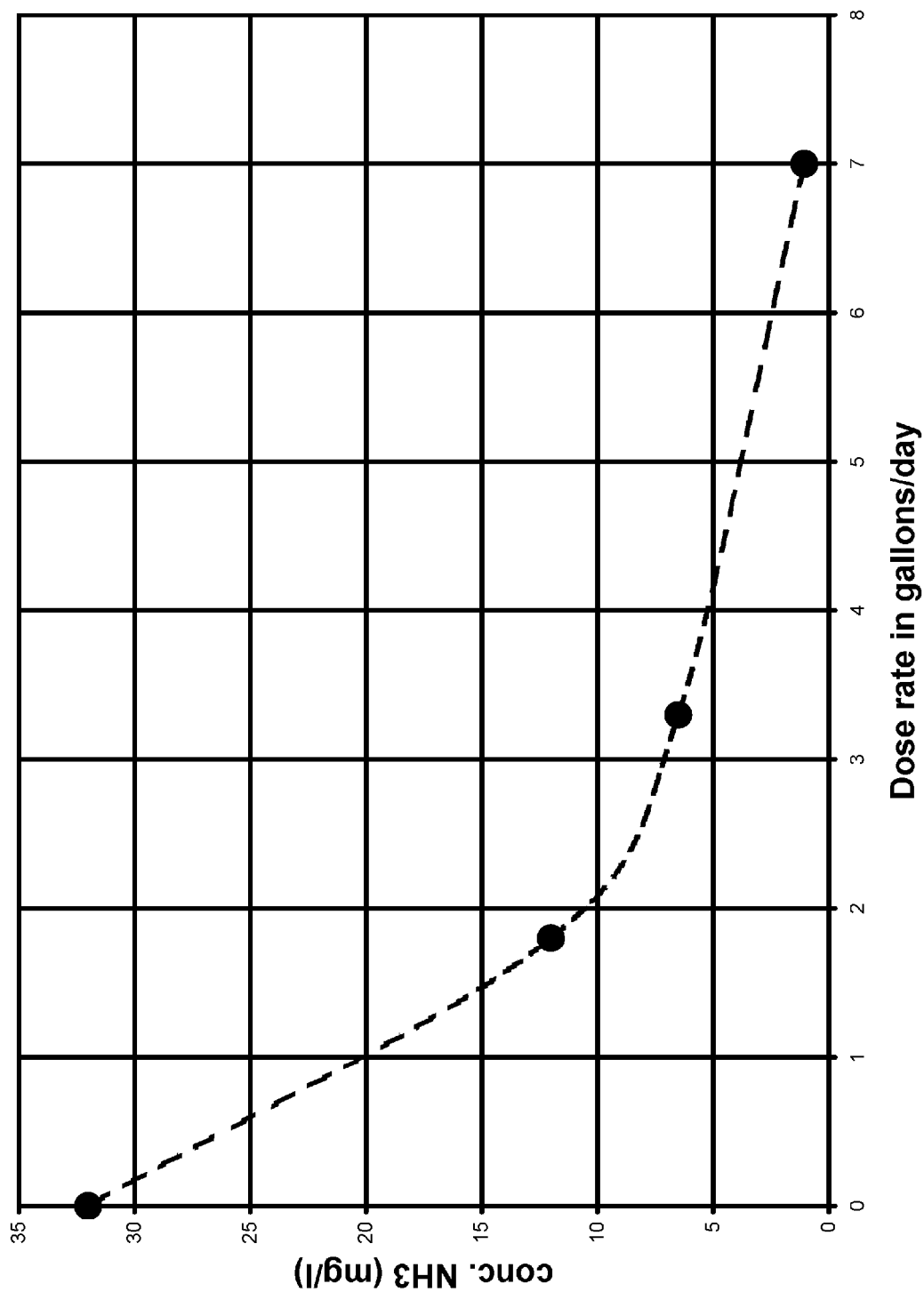
FIG. 8 is a graph showing an observed relationship between the feed rate to the bacteria generator and the steady state concentration of residual ammonia.

FIG. 8 is a plot of the ammonia concentration in a typical treatment system as a function of dose rate to the generator. The total treatment vessel volume is about 800 gallons (3,200 L) and the system deploys the inventive generator as well as the prior art FBG. The inventive generator has a diameter of 1 ft. (30 cm) and height of about 52 inches (130 cm) for a volume of about 100 gallons (400 L), however, owing to the displacement of the inner tube and the porous but solid media that support the bacteria culture, the fluid volume is only about 22 gal. (88 L).

Thus, the data represents the average of several measurements after the conditions have appeared to reach a steady state. It should be understood that the time it takes to achieve a steady stead will vary depending on the initial ammonia concentration, but can vary day to day by several mg/l. However, generally steady state conditions are achieved in less than the mean residence time in the generator. The mean residence time is simply the fluid volume of the container used to form the ABG divided by the rate of flow into the container.

As can be seen in FIG. 8, the ammonia concentration drops rapidly to about 10 mg/l as the rate of addition is increased to about 2 gallons/day, or a mean residence time of about 11 days, however further reductions to as low as about 0.5 to 2 mg/L, and possibly lower are achieved when the flow rate is increased to about 7 gal./day (or a mean residence time of about 3 days). These results are achieved while simultaneously reducing the nitrate and nitrite to below about 1 mg/L, with the nitrite frequently being less than 0.1 mg/l or undetectable. It should of course be appreciate that the flow rate cannot be increased indefinitely, as eventually extremely high rates will merely deplete the generator of bacteria and frustrate the purpose of providing a generator that provides a sustained bacterial population. Accordingly, it is important to restrict the exchange of the medium within the generator with that surrounding it, in the manner described above using the flow into the generator to displace a limited portion of the volume or equivalent methods. Thus, the preferred rate of addition of fluid to the ABG is such to provide a mean residence time of less than 7 days and greater than about 12 hours. It is more preferable that rate of addition of fluid to the ABG is such to provide a mean residence time of less than about 4 days and greater than about 1 days.

While the invention has been described in connection with various preferred embodiments, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. A method of wastewater treatment, the method comprising the steps of:

a) providing a first vessel for holding and digesting wastewater with a facultative heterotrophic bacteria as the dominant microbial population,
b) admitting wastewater into the first vessel,
c) providing a second vessel for the growth of autotrophic ammonia oxidizing bacteria having autotrophic ammonia oxidizing bacteria as the dominant microbial population,
d) removing a predetermined portion of fluid from the first vessel,
e) admitting at least a part of the predetermined portion of fluid into the second vessel,
f) providing restricted fluid communication between the first and second vessel whereby the portion of fluid admitted to the second vessel remains in the second vessel for a sufficient amount of time to replenish the volume of the first vessel with autotrophic ammonia oxidizing bacteria where the facultative heterotrophic bacteria are the dominant microbial population.

2. The method of claim 1 wherein the second vessel is disposed within the first vessel.

3. The method of claim 1 wherein the second vessel is provided with a repository for a staffing culture of autotrophic ammonia oxidizing bacteria.

4. The method of claim 3 wherein the autotrophic ammonia oxidizing bacteria convert ammonia to nitrite ($NO_2$) in at least the first vessel.

5. The method of claim 1 in which the facultative bacteria within the first vessel strip the oxygen from the nitrite and convert it to gaseous nitrogen thereby denitrifying the effluent.

6. The method of claim 1 wherein the second vessel for the production of the ammonia oxidizing bacteria is created by partitioning a portion of the first vessel to close off a water column from the rest of the liquid in the entire first vessel wherein the partition extends upward above the fluid surface to preclude fluid passing over the partition.

7. The method of claim 6 wherein the bottom of the column or side partitions is closed limiting flow from the outer vessel into the first vessel.

8. The method of claim 1 whereby a pump is used to remove the predetermined portion of fluid from the first vessel.

9. The method of claim 1 whereby the predetermined portion of fluid being introduced into the second vessel contains sufficient ammonia to support a colony of ammonia oxidizing bacteria.

10. The method of claim 1 wherein the second vessel has a reserve of inorganic carbon.

11. The method of claim 1 wherein organic carbon is depleted in the first vessel due to the prolonged aerobic treatment time thereby inhibiting the growth of facultative heterotrophs.

12. The method of claim 11 whereby digestion of the carbon creates mineral carbonates fostering the growth of autotrophic ammonia oxidizing bacteria in the second vessel.

13. The method of claim 1 wherein the at least a part of the predetermined portion of liquid admitted to the second vessels displaces liquid from the second vessel forcing it out into the first vessel.

14. The method of claim 13 whereby the displaced liquid is enriched with autotrophic ammonia oxidizing bacteria.

15. The method of claim 6 the autotrophic ammonia oxidizing and facultative heterotrophic bacteria jointly provide a denitrifying reaction that is sustained through the steady inoculation of the more sensitive autotrophs into the portion of the first vessel that is outside of the partition that forms the second vessel.

16. The method of claim 1 further comprising the step of providing a third treatment vessel that is aerated for sustaining a colony of facultative heterotrophic bacteria wherein the flow of fluid between the first vessel and the third vessel is less restrictive than that between the first and second vessel.

17. The method of claim 1 wherein the predetermined portion of fluid admitted into the second vessel has a mean residence time of less than 7 days and greater than about 12 hours.

18. The method of claim 1 wherein the predetermined portion of fluid admitted into the second vessel has a mean residence time of less than about 4 days and greater than about 2 days.

19. A method of wastewater treatment, the method comprising the steps of:
a) providing a wastewater treatment vessel,
b) admitting wastewater to the treatment vessel,
c) providing an at least partially isolated zone within the wastewater treatment vessel,
d) fostering the growth of autotrophic ammonia oxidizing bacteria in the at least partially isolated zone wherein the autotrophic ammonia oxidizing bacteria are moved from the at least partially isolated zone to the surrounding treatment vessel in which facultative heterotrophic bacteria are the dominant microbial population.

20. The method of claim 19 wherein the autotrophic ammonia oxidizing bacteria convert ammonia to nitrite ($NO_2$) the treatment vessel.

21. The method of claim 20 in which the facultative bacteria within the treatment vessel strip the oxygen from the nitrite and convert it to gaseous nitrogen thereby denitrifying the effluent.

22. The method of claim 19 wherein the zone of production of the ammonia oxidizing bacteria is created by inserting a column or installing side partitions that close off a water column from the rest of the liquid in the entire treatment vessel and extend upward so that no flow passes over the partition.

23. The method of claim 22 wherein the bottom of the column or side partitions is closed limiting flow from the outer vessel into the interior confined space.

24. The method of claim 23 further comprising said step of pumping a controlled flow of liquid into the isolated zone from the surrounding waste water treatment vessel.

25. The method of claim 21 whereby the liquid in the surrounding waste water treatment vessel retains nitrogen in the form of ammonia due to the activity of the facultative bacteria in preventing establishment of nitrate producing bacteria.

26. The method of claim 23 further comprising said step of pumping a controlled flow of liquid into the isolated zone, the fluid containing sufficient ammonia to support a colony of ammonia oxidizing bacteria.

27. The method of claim 19 further comprising the steps of:
a) providing a second at least partially isolated zone within the wastewater treatment vessel, and
b) fostering the growth of facultative heterotrophic bacteria in the second at least partially isolated zone.

28. The method of claim 27 further comprising the step of:
a) pumping liquid from the wastewater treatment vessel to the first at least partially isolated zone that fosters the growth of autotrophic ammonia oxidizing bacteria,
b) wherein the mean residence time of fluid with the first at least partially isolated zone is substantially longer than that fluid in the second at least partially isolated zone within the wastewater treatment vessel.

29. A method of wastewater treatment, the method comprising the steps of:
   a) providing a wastewater treatment vessel,
   b) admitting wastewater to the treatment vessel,
   c) providing an at least partially isolated zone within the wastewater treatment vessel,
   d) fostering the growth of autotrophic ammonia oxidizing bacteria in the at least partially isolated zone further comprising the step of providing prolonged aerobic treatment to the wastewater treatment vessel to inhibit the growth of facultative heterotrophs therein.

30. A method of wastewater treatment, the method comprising the steps of:
   a) providing a wastewater treatment vessel,
   b) admitting wastewater to the treatment vessel,
   c) providing an at least partially isolated zone within the wastewater treatment vessel,
   d) fostering the growth of autotrophic ammonia oxidizing bacteria in the at least partially isolated zone whereby the digestion of the carbon creates mineral carbonates fostering the growth of autotrophic ammonia oxidizing bacteria in the at least partially confined zone.

31. The method of claim 24 whereby said step of pumping displaces liquid from within the at least partially confined zone out into the wastewater treatment vessel.

32. The method of claim 31 whereby the fluid displaced from the at least partially confined zone region is enriched with autotrophic ammonia oxidizing bacteria.

33. The method of claim 19 whereby the denitrifying reaction carried out by the joint action of the autotrophic ammonia oxidizing and facultative heterotrophic bacteria is sustained through the steady inoculation of the more sensitive autotrophs from at least one of the partially confined zones into the wastewater treatment vessel.

34. An apparatus for wastewater treatment, the apparatus comprising:
   a) a first treatment vessel having at least one portal for entry wastewater to be treated,
   b) a first aerated sub-chamber in substantial fluid communication with the first treatment vessel for supporting a colony of facultative heterotrophic bacteria,
   c) a second aerated sub-chamber in limited fluid communication with at least one of the first treatment vessel and the first aerated sub-chamber for supporting a colony of autotrophic ammonia oxidizing bacteria,
   d) a pump for removing a limited portion of the wastewater under treatment from at least one of the first treatment vessel and the first aerated sub-chamber for the delivery to the second aerated sub-chamber, and
   e) a second portal for the removal of treated water from a portion of the first treatment vessel that excludes the second aerated sub-chamber wherein only a fraction of the wastewater entering said first treatment vessel is capable of entering the second aerated sub-chamber.

35. An apparatus for wastewater treatment according to claim 34 wherein the first aerated sub-chamber has an upper opening to be submerged below the wastewater in the first vessel.

36. An apparatus for wastewater treatment according to claim 35 wherein the second aerated sub-chamber has a substantially sealed upper opening.

37. An apparatus for wastewater treatment according to claim 35 wherein the second aerated sub-chamber has an upper opening that is raised above the opening of the first aerated sub-chamber so that it is above the level of the wastewater in the first vessel.

38. An apparatus for wastewater treatment according to claim 35 wherein the second aerator has a central tube, surrounding porous packing for supporting the bacteria.

* * * * *